(12) United States Patent
Miyashita

(10) Patent No.: US 7,330,515 B2
(45) Date of Patent: Feb. 12, 2008

(54) METHOD AND APPARATUS CAPABLE OF RESTRICTING RESENDING OPERATION

(75) Inventor: Atsushi Miyashita, Tokorozawa (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 738 days.

(21) Appl. No.: 10/773,143

(22) Filed: Feb. 9, 2004

(65) Prior Publication Data

US 2004/0156428 A1  Aug. 12, 2004

(30) Foreign Application Priority Data

Feb. 10, 2003  (JP) .............................. 2003-032126

(51) Int. Cl.
*H04L 27/00* (2006.01)
(52) U.S. Cl. ...................... 375/295; 375/211
(58) Field of Classification Search ............... 375/211, 375/295, 213, 297
See application file for complete search history.

(56) References Cited

U.S. PATENT DOCUMENTS 5,345,271 A * 9/1994 Shin ........................... 348/525

2002/0057750 A1 * 5/2002 Nakao et al. ............... 375/345

FOREIGN PATENT DOCUMENTS

| JP | 10322307 | 12/1998 |
|----|----------|---------|
| JP | 2002-94482 | 3/2002 |

* cited by examiner

*Primary Examiner*—Emmanuel Bayard
(74) *Attorney, Agent, or Firm*—Mattingly, Stanger, Malur & Brundidge, P.C.

(57) ABSTRACT

A method and apparatus capable of restricting the resending operation are disclosed, in which the resending operation is controlled by determining the conditions of the input signal from a movable transmitting end, based on the guard interval period set in the signal to be resent, thereby resending only a valid transmission signal. Once an input signal is supplied from the movable transmitting end to the resending apparatus, a guard information detector determines whether the input signal is to be resent or not, based on the degree of correlation of the guard interval period, and controls the operation of a voltage-controlled amplifier, thereby resending only a valid transmission signal. This determination is made based on the degree of correlation between a signal converted from the input signal and the guard interval period of the signal delayed from the converted signal.

13 Claims, 15 Drawing Sheets

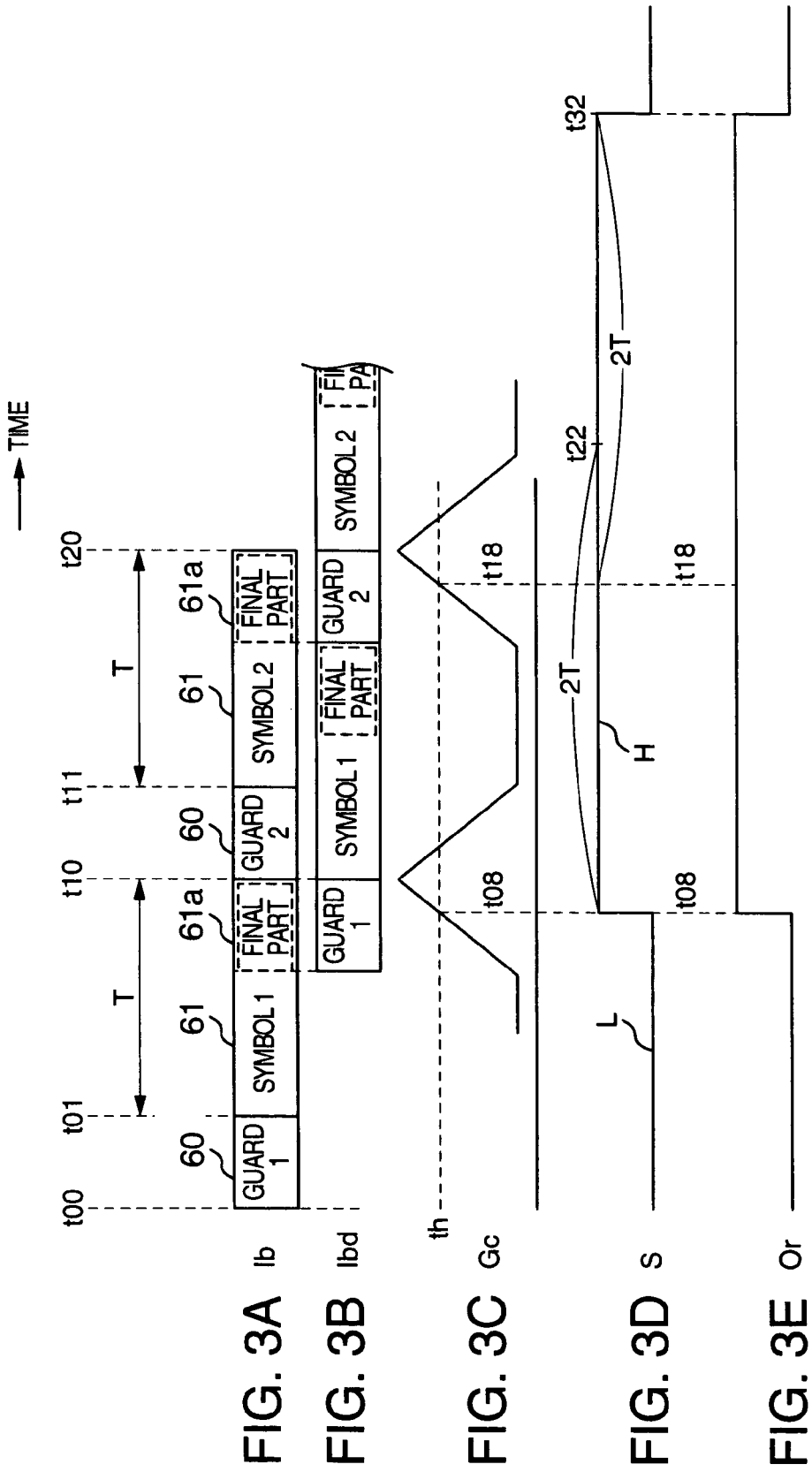

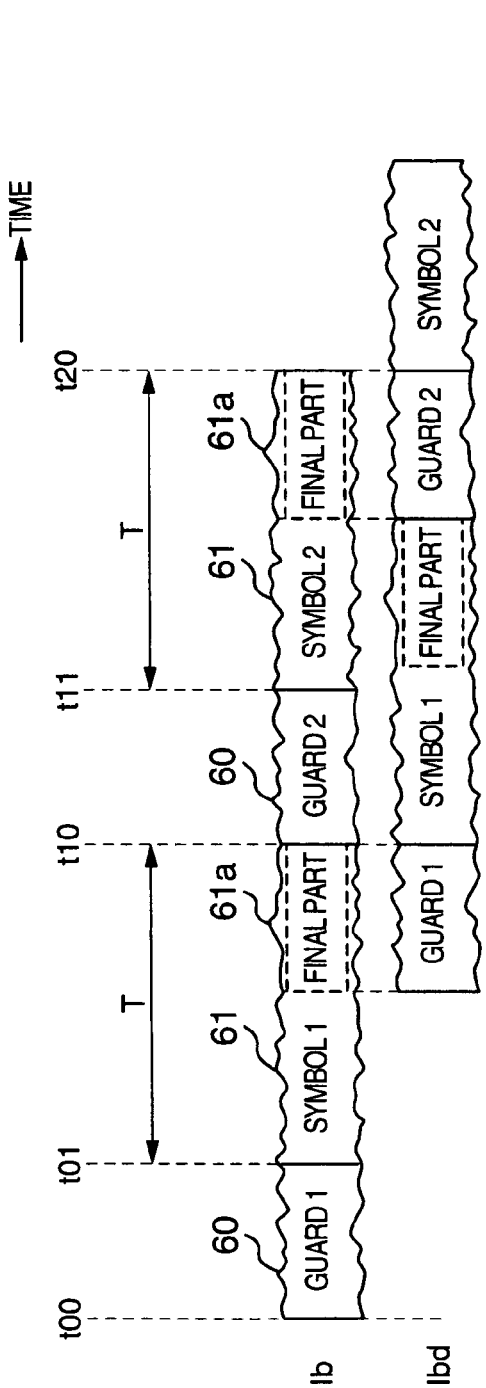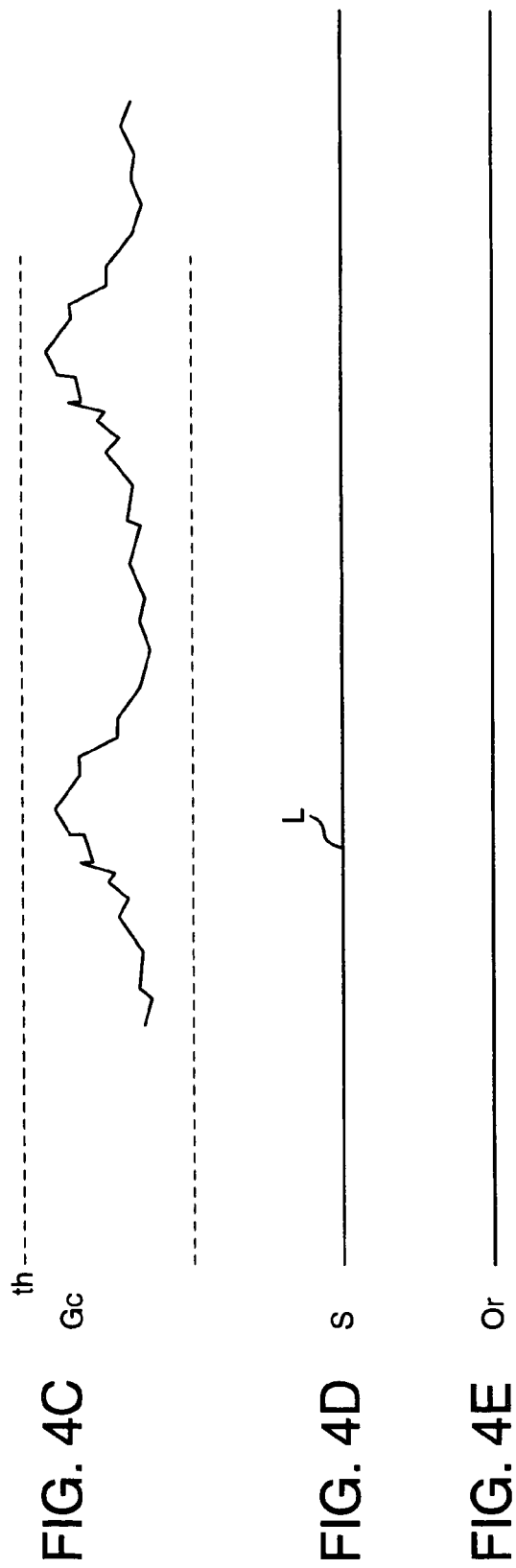

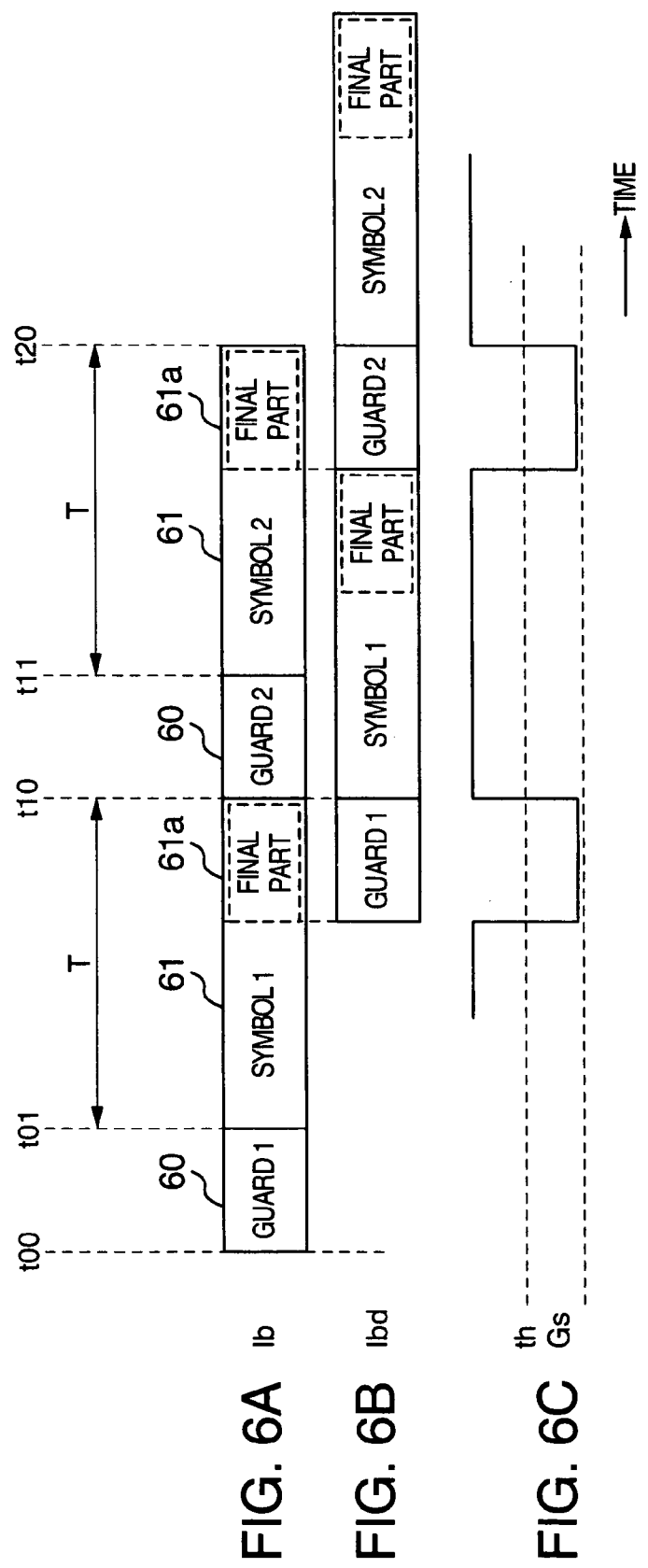

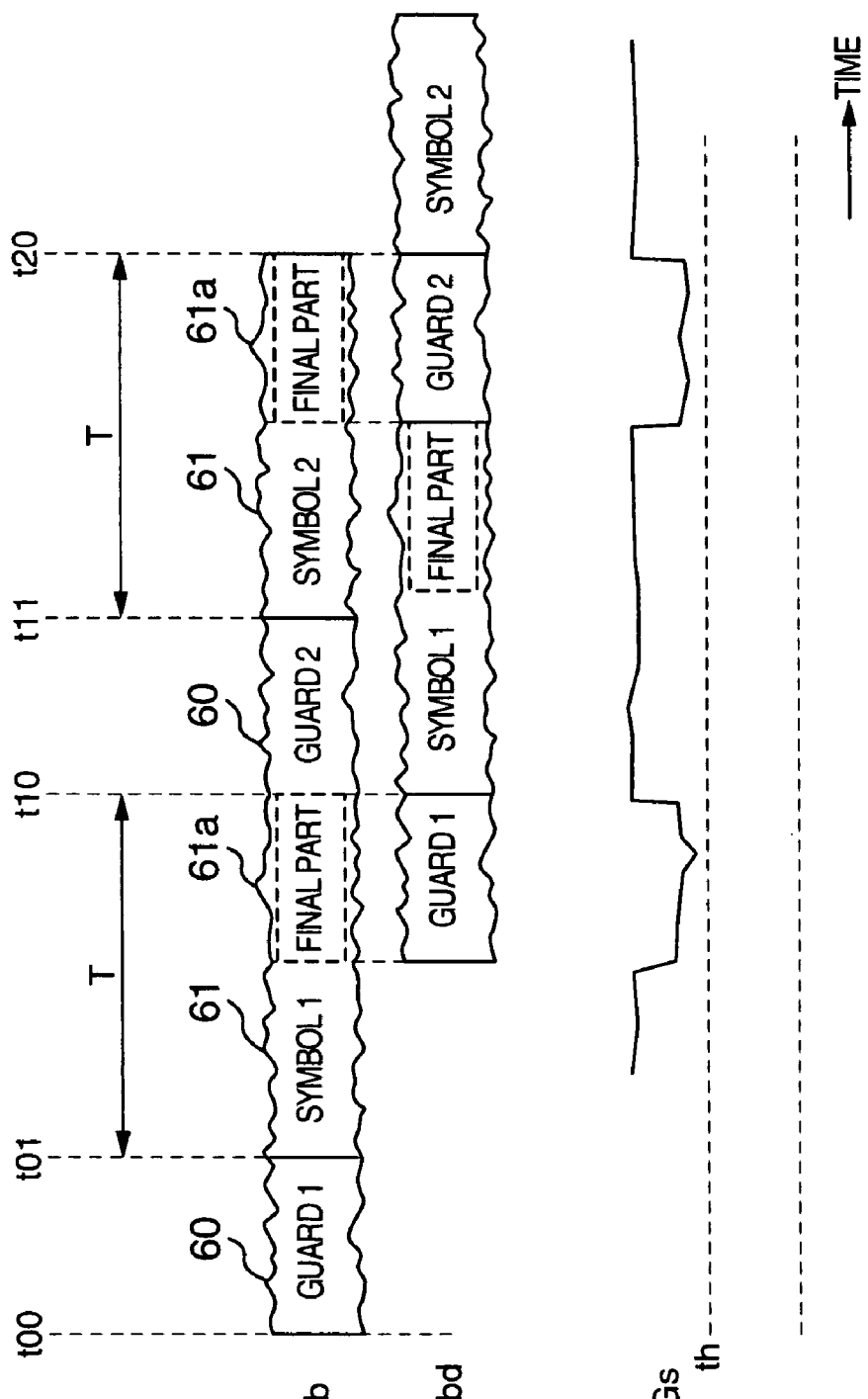

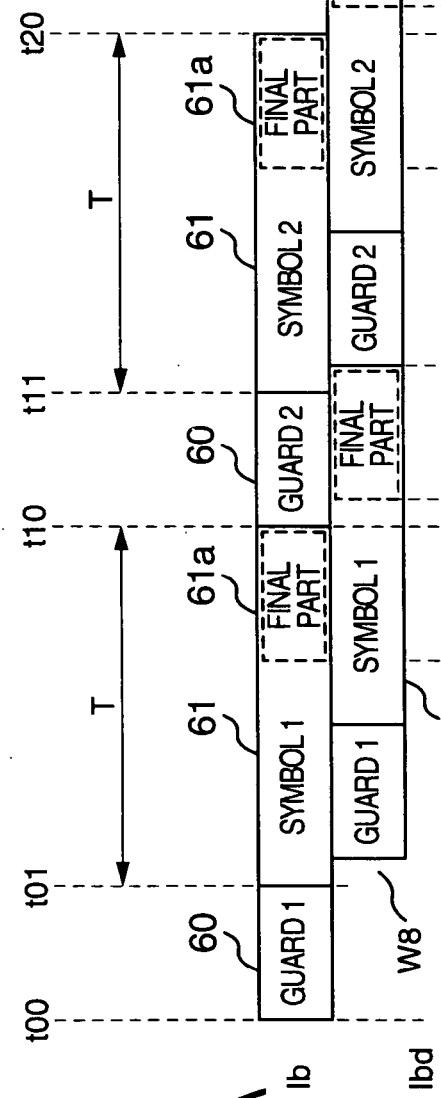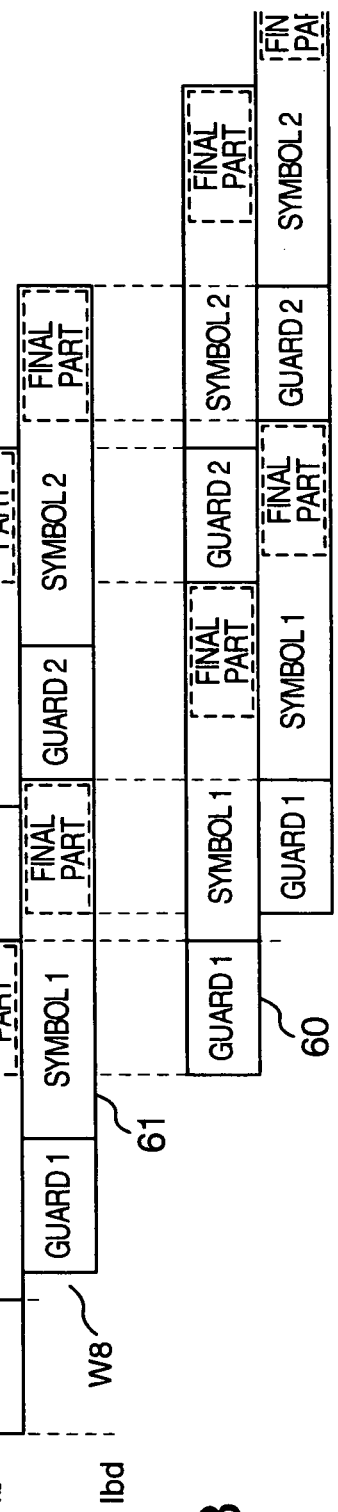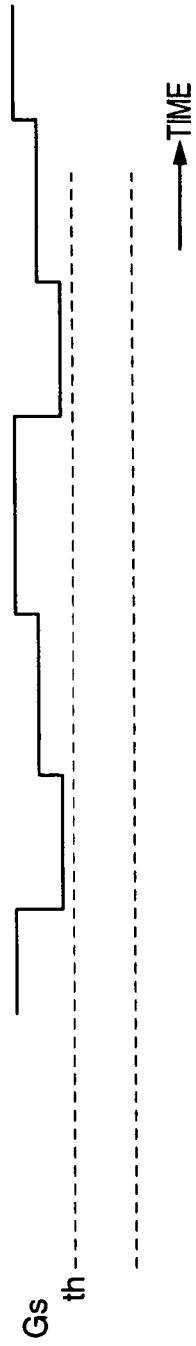
FIG. 8A
FIG. 8B
FIG. 8C

METHOD AND APPARATUS CAPABLE OF RESTRICTING RESENDING OPERATION

BACKGROUND OF THE INVENTION

The present invention relates to a method and an apparatus used for repeating and resending the digital transmission signal for television broadcasting, or in particular to a resending method and apparatus having the function of restricting the resending of an adversely-affecting signal such as noises.

In the live TV broadcast of a marathon or the like, a movable portable broadcasting link (such as FPU (field pickup unit)) is used, so that the television signal picked up by a camera is transmitted from the FPU to an airborne resending apparatus mounted on a helicopter or balloon and then from the resending apparatus to a broadcasting station.

The orthogonal frequency division multiplexing (OFDM) has recently begun to be used as a modulation scheme for transmission of the digital signal like the television signal.

In the OFDM modulation scheme, a multiplicity of carriers are used, and a guard interval period is added at the transmitting end to reduce the effect of a delayed wave which may be mixed, and therefore has a high resistance to an environment which may develop a fading.

In the digital signal transmission according to the OFDM modulation scheme, the information is digitized and the error correcting process is used. In the case of the selective fading with the level of a part of the frequency band reduced, the carrier in the band with no level reduction can be normally received. The data of the carrier lost by the selective fading, therefore, can be restored by the error correction. Also, even in the case where the signal delayed by reflection or the like is mixed, the signal is buffered by the guard interval period and not easily deteriorated.

In the OFDM transmission scheme, despite this high resistance, the ratio of noises to the signal increases if the received electric field level is decreased to less than the critical value. In such a case, the error of the carrier of normal level also increases to such an extent that the error of the whole carrier as well as a specified deteriorated carrier becomes difficult, and the normal transmission may become impossible.

The critical value is inversely proportional to the data amount transmitted. In the 64 QAM convolution correction 5/6 mode having the transmission rate of as much as 60 Mbps, for example, the critical carrier-to-noise (CN) ratio is about 24 dB, which requires the limit of the received electric field of not less than about −73 dBm. In the QPSK convolution correction 1/2 mode having a transmission rate as small as 12 Mbps, on the other hand, the critical CN ratio is about 6 dB, so that the normal transmission is possible with the receiving electric field limit of about −91 dBm or more.

As described above, the receiving electric field level has a great effect not only on the transmissible data amount and the reliability thereof but also on the mixing ratio of the reflected wave and the delay time thereof at the same time.

In the state generally called a "perspective state" free of buildings which otherwise might block the radio wave between the transmitting point and the receiving point, the basic receiving field level (intensity) at a receiving end 1 is determined by the radio wave's frequency and the distance between the transmitting point and the receiving point.

As shown in FIG. 9, for example, an area A is farthest from a repeater (receiving end) 1 up in the air as compared with an area B having a building 5 constituting a blocking object and an area C having a building 6 constituting a blocking object. In view of the fact that the area A is in perspective state, however, the location of a FPU (transmitting end) 2, if any, in the area A increases the field at the receiving end 1 to middle to high level and therefore realizes a stable signal transmission.

In what is generally called the over-the-horizon state where a building or the like blocking the radio wave exists between the transmitting point and the receiving point, the receiving field level at the receiving end 1 is lower than in the perspective state. In this case, the amount by which the signal decreases at the receiving end 1 as compared with the transmitting point is about 10 to 20 dB, depending on the size of the blocking building or the presence or absence of a path through which the radio wave is reflected and can reach the receiving point. In some cases, the amount of reduction is not less than 20 dB.

Assume, for example, that a FPU (transmitting end) 2 is located in the area B in which a large building 5 blocking the electric wave exists between the transmitting point and the receiving point. In spite of the fact that the area B is nearer to the repeater (receiving end) 1 than the area A, the radio wave W2 from the FPU (transmitting end) 2 is blocked by the building 5 and fails to reach the repeater (receiving end) 1, with the result that the field level at the receiving end 1 is reduced to a low level or zero.

In the case where the FPU (transmitting end) 2 is located in the area C as shown in FIG. 12, as another example, the over-the-horizon state prevails due to the building 6, so that the radio wave W5 directly transmitted from the FPU (transmitting end) 2 fails to reach the receiving end 1, while the radio wave W6 transmitted from the FPU (transmitting end) 2 and reflected on the wall surface of the building 5 in the area B reaches the repeater (receiving end) 1. As a result, the field at the receiving end 1 may be reduced to middle or low level.

In the case where the FPU (transmitting end) 2 is located between the area B and the area C (between buildings) as shown in FIG. 11, on the other hand, the direct wave W3 passing through a path in the perspective state and the wave W4 reflected from the building 5 may reach the repeater (receiving end) 1.

The OFDM transmission scheme generally has a high resistance to the radio wave containing the reflected wave (i.e. delayed wave), as described above. In the case where the radio wave contains a reflected wave having a delay time longer than the guard interval period, however, the noise ratio increases and normal receiving operation becomes impossible even when the field level is high at the receiving end 1.

The live broadcasting of a marathon race, for example, requires transmission of video data while moving the FPU along a course as long as 42 km. Various topologies and buildings exist along the course, most of which are liable to develop a transmission fault as shown in FIGS. 10 to 12. Depending on the frequency range of the radio wave used, in the case of the digital FPU in 7 GHz band, for example, the receiving signal not higher than −97 dBm is buried under noises. Even in the case where the gain of the amplifier at the receiving end 1 is increased, only the noises are generated and no correct transmission becomes possible.

In the prior art, therefore, as shown in FIG. 13, for example, a resending apparatus 3 called a gap filler is arranged at a high place such as on the roof of a building. The gap filler 3 receives the radio wave from the FPU (transmitting end) 2 on the roof of the building or the like, and amplifying the received signal, resends it toward the repeater (receiving end) 1.

An example of the gap filler is disclosed in JP-A-2002-94482.

SUMMARY OF THE INVENTION

In the OFDM signal repeater disclosed in JP-A-2002-94482, however, the FPU (transmitting end) is stationary and not in motion. Also, the frequency of the receiving signal is output by being changed to a different frequency. Further, in the case where the output of the OFDM modulator ceases to contain the OFDM signal for some reason or other, this fact is automatically detected and the transmission output is stopped. Furthermore, the output signal is not controlled to a level of a predetermined value.

On the other hand, the gap filler 3 having the configuration shown in FIG. 14 has been proposed. In the gap filler 3, the radio wave received by a receiving antenna 31 from the FPU (transmitting end) 2 is input to a voltage-controlled amplifier 32 as an input signal Ir, and the output signal Or of the voltage-controlled amplifier 32 is resent toward the repeater (receiving end) 1 from a resending antenna 34. This output signal Or is input also to a level detector 33, which adjusts and controls the control voltage Cr and outputs the control signal Cr to the voltage-controlled amplifier 32 in such a manner as to maintain the output signal Or at a predetermined constant value. The voltage-controlled amplifier 32 changes the gain of the amplifier in accordance with the control voltage signal Cr. Specifically, in the case where the transmission signal Ir received by the receiving antenna 31 is low in level, the gain of the amplifier 32 is increased, while in the case where the level of the transmission signal Ir is high, on the contrary, the gain of the amplifier 32 is decreased. In this way, the signal Or is output and resent always at a constant level.

In the gap filler (resending apparatus) 3 shown in FIG. 14, the received input signal Ir is amplified and resent always at a constant level. In the case where the transmitting end (FPU) 2 is located at a far position and the level of the input signal Ir is considerably low, therefore, a major portion of the resent signal constitutes noises.

Even in the case where the FPU 2 at the transmitting end is located in the area C as shown in FIG. 15, for example, and no valid signal input is supplied from the transmitting FPU 2 to the gap filler 3, the gap filler 3 resends the noise component W7 to the repeater 1 at the receiving end, with the result that the noise component at the receiving end 1 increases to create a state equivalent to a low electric field.

Also, the gap filler (resending apparatus) 3 shown in FIG. 14 amplifies and resends the input signal Ir always at a constant level regardless of the conditions or the type of the input signal Ir. Therefore, even a signal mixed with a reflected wave having a delay time longer than the guard interval period is also resent undesirably.

Assume, for example, that as shown in FIG. 16, the transmitting FPU 2 is located in the area C and the gap filler 3 arranged on the building 6 is supplied with a signal Ir mixed with a wave W8 having a long delay time reflected from another building 5. Even in the case where the input signal affected by the fading to a degree that cannot be neglected is resent to the repeater 1 at the receiving end, the normal transmission cannot be realized.

This invention has been achieved in view of this situation, and an object of the invention is to provide a resending method and apparatus capable of obviating the technological problems described above.

Another object of this invention is to provide a resending method and apparatus capable of conducting the appropriate resending process in accordance with the conditions of the signal sent from a movable transmitting end.

According to one aspect of the invention, there is provided a resending method and apparatus, wherein the resending process is restricted for the received transmission signal requiring no resending operation, using the information of the guard interval period of the transmission signal sent from the movable transmitting end and to be resent. Specifically, the transmission signal requiring no resending operation is not processed for the resending operation, or resent while suppressing the level of the resent signal to a level posing no problem at the receiving end.

In the invention having this configuration, the resending operation is controlled by determining the conditions of the input signal based on the guard interval period set for the signal to be resent, and therefore only a valid transmission signal can be resent.

As an example of the invention, it is determined whether a given signal is to be resent or not, based on the information of the guard interval period using a part of the information contained in each valid symbol duration of the transmission signal. The resending process is restricted for the input signals not to be resent (i.e. the signals requiring no resending) including a signal of a different type having no guard interval period, a signal whose level has been so reduced that the guard interval period cannot be detected, and a signal mixed with a reflected wave over the guard interval period causing an interference with the delayed wave to such an extent that the guard interval period cannot be detected.

According to another aspect of the invention, there is provided a resending apparatus, wherein with regard to the transmission signal sent from a movable transmitting end and having a guard interval period containing a part of the information of the valid symbol duration, the valid symbol duration of the input signal is delayed by a delay unit, and the degree of correlation between the guard interval periods of the delayed signal and the input signal is determined by a determining unit, so that in the case where the determined degree of correlation is lower than a predetermined value, a control unit restricts the amplification process of the input signal by an amplifier thereby to substantially suspend the resending of the input signal.

Specifically, the guard interval period contains the same information as the part of the input signal determined, and therefore, in the case where the degree of correlation between the guard interval periods is lower than a predetermined value, the resending of the particular signal is substantially suspended as a signal to be excluded from the object of resending.

Other objects, features and advantages of the invention will become apparent from the following description of the embodiments of the invention taken in conjunction with the accompanying drawings.

BRIEF DESCRIPTION OF THE DRAWINGS

FIGS. 3A to 3E are timing charts showing various signal waveforms for explaining the operation of the first embodiment of the invention.

FIGS. 4A to 4E are timing charts showing various signal waveforms for explaining the operation of the first embodiment of the invention.

FIGS. 6A to 6C are timing charts showing various signal waveforms for explaining the operation of the second embodiment of the invention.

FIGS. 7A to 7C are timing charts showing various signal waveforms for explaining the operation of the second embodiment of the invention.

FIGS. 8A to 8C are timing charts showing various signal waveforms for explaining the operation of the second embodiment of the invention.

DETAILED DESCRIPTION OF THE EMBODIMENTS

Figure 1:
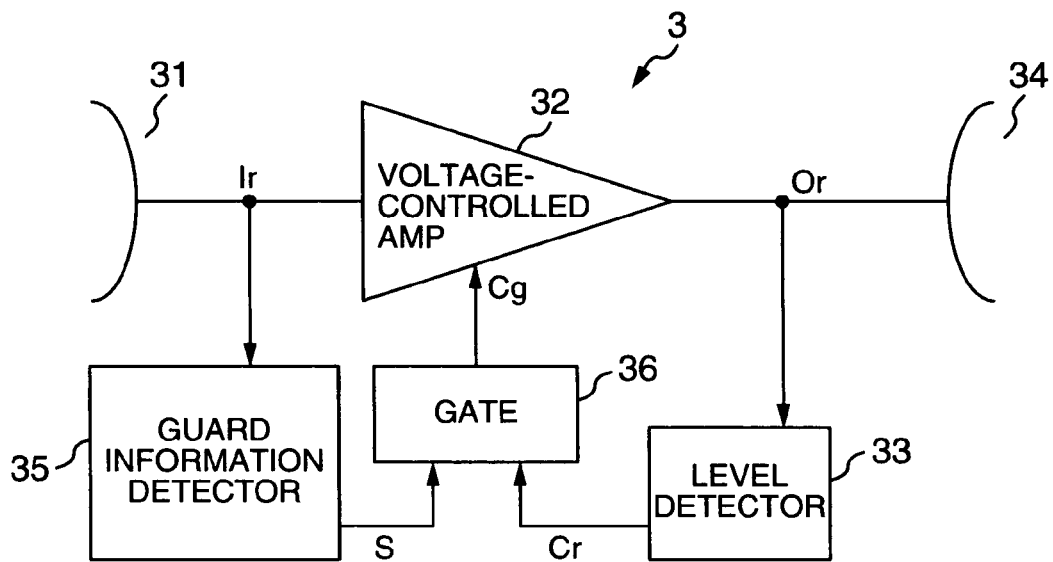
FIG. 1 is a block diagram showing a configuration of a resending apparatus according to an embodiment of the invention.

Before explaining a resending method and apparatus according to embodiments of the invention, the concept of the embodiments are explained below with reference to FIGS. 3A to 3E and FIGS. 6A to 6E.

As described later with reference to an embodiment, a signal 1b is the result of frequency change and A/D conversion of a signal Ir input from a movable transmitting end. A signal Ibd is a delay signal obtained by delaying the signal Ib by a predetermined time.

The OFDM signal constituting the input signal Ir has a guard interval period with a waveform added thereto in the same state as a time waveform of a part (the final part) of the valid symbol duration.

As shown in FIGS. 3A to 3E and FIGS. 6A to 6E, the signal Ib is compared with the signal Ibd delayed from the signal Ib by the time T corresponding to the valid symbol duration. Then, the same waveform is generated during the guard interval period. As long as a valid OFDM signal exists, therefore, the same waveform is generated leading to a high degree of correlation between the two signals. In the case where the signal Ir contains only noises, on the other hand, the same waveform is not developed for lack of similarity in the noises. Thus, the same wave is not developed, and there is no degree of correlation between the signal Ib and the signal Ibd.

Taking advantage of these characteristics, it is determined whether the input signal Ir is a valid OFDM signal or not. Assuming that the maximum degree of correlation between the signal Ib and the signal Ibd delayed from the signal Ib by the time T corresponding to the valid symbol duration is 1, it may be determined that a valid OFDM signal exists if the degree of correlation is not less than 0.3, for example.

Various methods can be employed for determining the degree of correlation. For example, whether the input signal Ir is an OFDM wave or not is determined from whether the product Gc of the signal Ib and the signal Ibd has exceeded a predetermined level th or not as shown in FIG. 3, or from whether the difference Gs between the signal Ib and the signal Ibd is not more than a predetermined level th as shown in FIG. 6.

The degree of correlation increases for each delay time T, and therefore the product Gc of the signal Ib and the signal Ibd exceeds the predetermined level th. Once the product Gc has exceeded the predetermined level th, the signal is amplified by an amplifier for at least one symbol duration. In the case where the product Gc decreases below the predetermined level th, on the other hand, the amplification by the amplifier is substantially suspended. In this way, the signal is resent substantially while the valid OFDM signal is input to the resending apparatus.

The analog FM wave and the single QAM wave considered noises have no periodical correlation of time T as described above. Therefore, the similarity is not increased, and the product Gc is not increased beyond the predetermined level th.

In view of the fact that degree of correlation increases for each delay time T, the difference Gs between the signal Ib and the signal Ibd is also decreased below the predetermined level th. Once the difference Gs is decreased below the predetermined level th, the amplification by the amplifier is carried out for at least one symbol duration, while once the difference Gs has exceeded the predetermined level th, the amplification by the amplifier is suspended. In this way, the resending operation is performed only while the valid OFDM signal is input to the resending apparatus.

The lowest level of the difference Gs indicates the ratio of the reflected delay wave mixed with the signal. Specifically, in the case of an OFDM wave containing the reflected wave having a large delay longer than the guard interval period, the similarity range of the guard interval period having the degree of correlation is dispersed by other symbol signals mixed in, thereby making it difficult to reduce the level of the lowest value of the difference Gs.

By judging the state in this way, the signals other than the OFDM wave can be prevented from being resent, while at the same time preventing the resending of a waveform mixed with the reflected wave having a long delay time difficult to transmit normally. In this way, only the valid OFDM signal can be resent.

The criterion th is set to a ratio with the period having no degree of correlation as a reference. In the case of the modulation such as 64 QAM requiring a high CN, for example, the criterion of the difference Gs is set to a comparatively low level (while the criterion of the product Gc is set to a comparatively high level). In the case of the modulation such as QPSK operable even at a low CN, on the other hand, the criterion of the difference Gs is set to a comparatively high level (while the criterion of the product Gc is set to a comparatively low level).

Next, embodiments of the invention are explained specifically.

FIG. 1 shows a configuration of a resending apparatus according to an embodiment of the invention.

Figure 14:
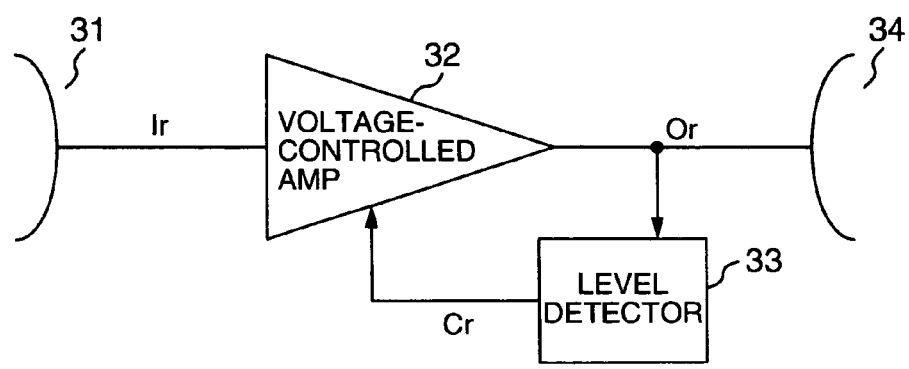
FIG. 14 is a block diagram showing a configuration of the resending apparatus.
Figure 15:
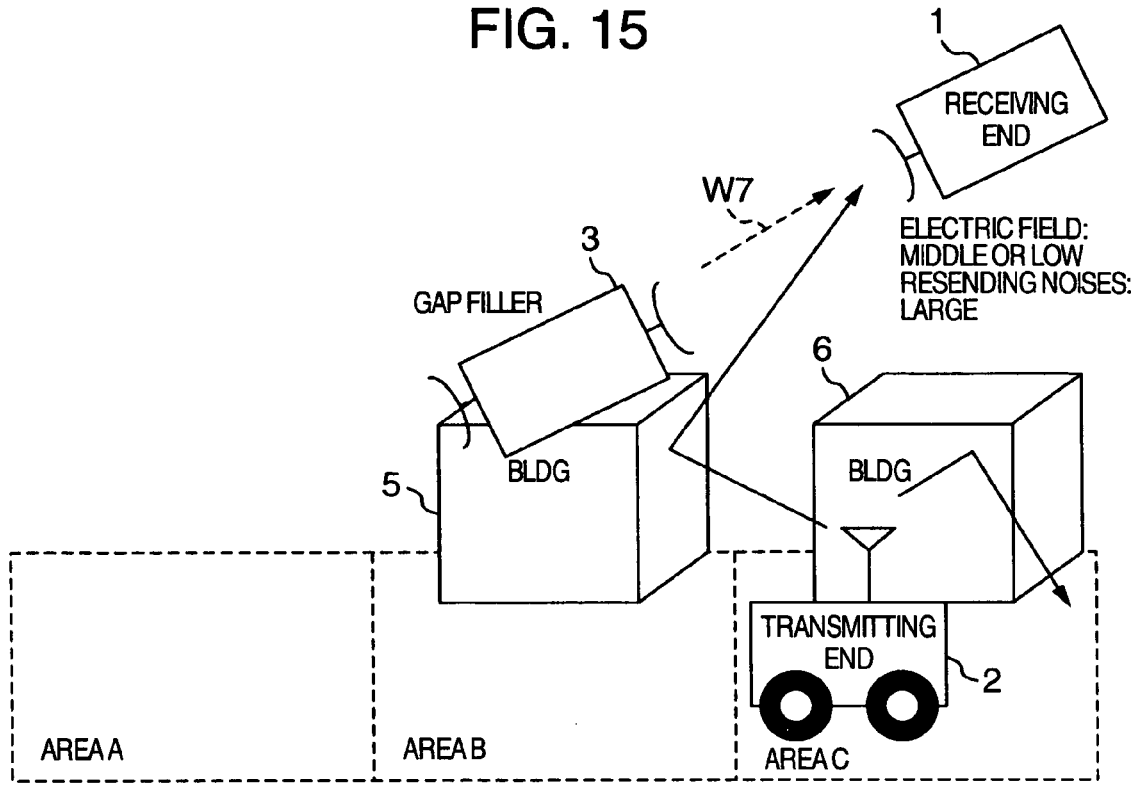
FIG. 15 is a schematic diagram for explaining the resending operation.

In the description that follows, FIG. 9 to FIG. 19 are referred to appropriately, in which the component parts having a similar function to the corresponding parts of the conventional configuration shown in FIG. 14 are designated by the same reference numerals, respectively, and not described twice.

In the resending apparatus (gap filler) 3 shown in FIG. 1, an input signal Ir received from a movable FPU (transmitting end) 2 through a receiving antenna 31 is input to a voltage-controlled amplifier 32, and resent to a repeater (receiving end) 1 from a resending antenna 34 as an output signal Or amplified to a predetermined level by the voltage-controlled amplifier 32. The output signal Or is also input to a level detector 33, and a control signal Cr from the level detector 33 is input to the control terminal of the voltage-controlled amplifier 32 as a control voltage Cg through a gate 36. Thus, the control voltage applied to the voltage-controlled amplifier 32 is regulated by the level detector 33 in such a manner as to maintain a predetermined constant value of the output signal Or.

In the gap filler 3 shown in FIG. 1, the input signal Ir is also input to a guard information detector 35, and an output S of the guard information detector 35 is input to the control terminal of the gate 36. Specifically, the gate 36 is opened/closed in accordance with the output S of the guard information detector 35, so that the control voltage Cr from the level detector 33 is turned on/off to turn on/off the control voltage Cg input to the voltage-controlled amplifier 32.

Unlike in the prior art, the gap filler 3 shown in FIG. 1 includes the guard information detector 35 and the gate 36, which constitute a control means for determining whether a given signal is to be resent or not, based on the information of the guard interval period. In the case where a given signal is not to be resent, the amplification by the voltage-controlled amplifier 32 is substantially suspended thereby to restrict the resending process.

Signals not to be resent, i.e. signals not required to be resent, or in other words, signals other than the valid OFDM wave include, as described above, a signal of a different type having no guard interval period set therein, a signal of a level so low that the guard interval period cannot be detected and a signal mixed with a reflected signal over the guard interval period which interferes with the delay wave to such an extent as to make detection of the guard interval period impossible.

Specifically, as long as the input signal Ir is a valid OFDM wave having a guard interval period of a predetermined cycle, the guard information detector 35 outputs a signal S indicating the fact, e.g. a high-level signal S to the gate 36. In the case where the high-level signal S is input to the control terminal thereof, the gate 36 outputs the input Cr directly to the control terminal of the voltage-controlled amplifier 32 as a control voltage Cg.

As long as a signal S, such as a low-level signal S, indicating the input of no valid OFDM wave is applied to the control terminal of the gate 36 from the guard information detector 35, on the other hand, the gate 36 cuts off the input Cr (or substituting 0), and sets the output Cg to the control terminal of the voltage-controlled amplifier 32 to zero.

As a result, in the state where the valid OFDM wave is input to the gap filler 3, a control loop is formed to amplify the resent signal Or to a predetermined level thereby to control the voltage-controlled amplifier 32 based on the input Cr. Specifically, in the case where the OFDM wave signal Ir received by the receiving antenna 31 is low in level, the gain of the amplifier 32 is increased, while in the case where the OFDM wave signal Ir is high in level, the gain of the amplifier 32 is decreased. In this way, the resent signal Or always kept at a constant level is output from the resending antenna 34.

In the case where no valid OFDM wave is input, on the other hand, the control signal Cg to the voltage-controlled amplifier 32 is reduced to zero and the control loop is cut off. Thus, the voltage-controlled amplifier 32 performs no amplifying operation thereby to prevent the unnecessary signal from being resent.

Figure 2:
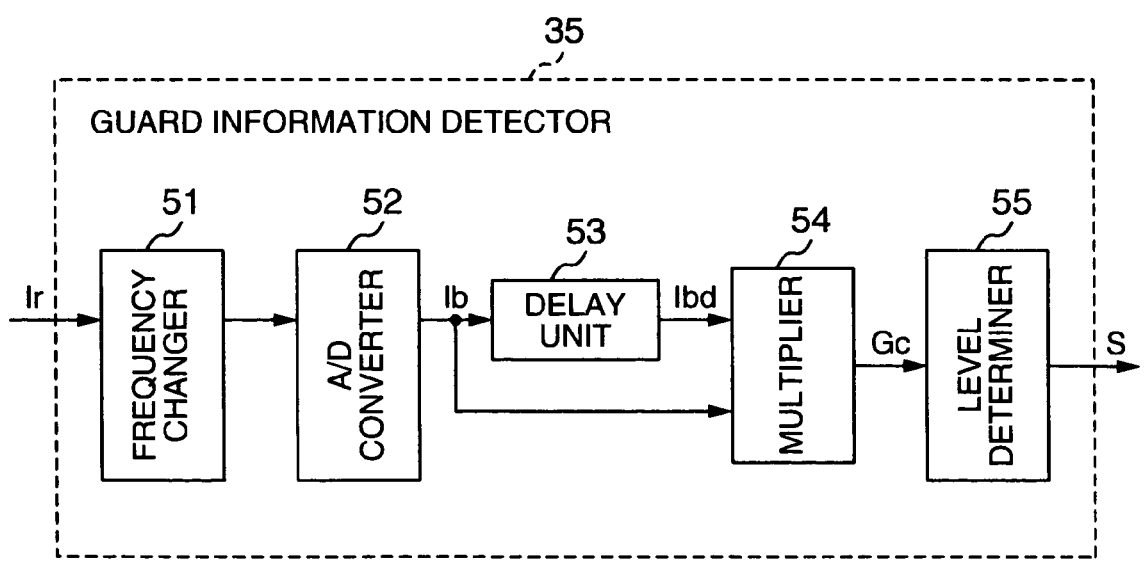
FIG. 2 is a block diagram showing a configuration of a guard information detection unit according to a first embodiment of the invention.

FIG. 2 shows an example of a configuration of the guard detector 35 according to the first embodiment of the invention.

An input signal Ir is input to a frequency changer 51, and then converted into a digital signal Ib in baseband by an A/D converter 52. This signal Ib is input to a delay unit 53 and a multiplier 54, and the output Ibd of the delay unit 53 is input to the other terminal of the multiplier 54. The output Gc of the multiplier 54 is input to a level determiner 55, which compares the level of the product Gc with a preset reference value th and outputs the result of determination to the control terminal of the gate 36.

The frequency changer 51 is so configured as to frequency-change the input signal Ir to the baseband, and the signal frequency-changed to the baseband by the frequency changer 51 is converted by the A/D converter 52 to a digital signal and output as a signal Ib.

The delay unit 53 delays the input signal Ib by the time T corresponding to one valid symbol duration, and outputs it as a delay signal Ibd.

The multiplier 54 multiplies the input signal Ib by the signal Ibd, and applies the signal Gc indicating the product to the level determiner 55. In the case where the product input signal Gc indicating the product exceeds the predetermined level th even for a moment, the level determiner 55 outputs the high-level control signal S for at least one symbol duration T, or, say, 2T in response. As described later, the degree of correlation is determined in cycle T based on the guard interval period. In the case where the degree of correlation of more than a predetermined level exists (i.e. in the case where a valid OFDM wave signal is involved), therefore, a valid OFDM wave signal can be resent by opening the gate 36 and rendering the amplifier 32 to perform the amplifying operation for at least one symbol duration. In this example, a valid OFDM wave signal can continue to be resent by keeping the gate 36 open for another one symbol duration (i.e. for a total of 2T). Incidentally, the period during which the gate 36 is opened in response to the fact that the input signal Gc exceeds the predetermined level th is not less than one symbol duration T but not longer than several symbol durations.

Also, the level determiner 55 may be configured of, for example, a one-shot multivibrator which outputs a high-level signal S in response to the fact that the input signal Gc exceeds the predetermined level th.

Next, the operation of this embodiment at the time of receiving an effective OFDM wave signal is explained with reference to FIGS. 3A to 3E and 4A to 4E.

In this embodiment, the OFDM wave signal constituting an input signal Ir (or a signal Ib converted therefrom), as shown in FIG. 3A, includes a guard interval period 60 set for each symbol duration at the transmitting end. These guard interval periods 60 have added thereto the same waveform as the time waveform of a part of the information of the valid symbol duration 61 (in the case of FIG. 3A, the final part 61a of the valid symbol duration 61).

As compared with the signal Ib to which the input signal Ir is converted, as shown in FIG. 3B, the delay signal Ibd is delayed by the time T corresponding to the valid symbol duration 61, so that the final part 61a of the valid symbol duration 61 of the signal Ib and the guard interval period 60 of the delay signal Ibd are temporally superposed one on the other.

In the case where the input signal Ir is a valid OFDM wave having a middle or high field level, the SN (signal-to-noise ratio) of the signal is so high that the waveforms of the final part 61a of the valid symbol duration 61 of the signal Ib and the guard interval period 60 of the delay signal Ibd have a high similarity (degree of correlation). As shown in FIG. 3C, therefore, the peak portion of the output Gc of the multiplier 54 increases to a level higher than the reference value th at time point t08. Once the product Gc increases beyond the reference value th, the level determiner 55 outputs a high-level control signal S giving an instruction to open the gate 36 to the gate 36 for 2T time from time point t08 to time point t22. Thus, the control signal Cr is input to the control terminal of the voltage-controlled amplifier 32 as a control voltage Cg through the gate 36, and after time point t08, the resent signal Or (FIG. 3E) is resent from the resending antenna 34 for the time length of 2T. In the shown case, the waveforms of the final part 61a of the valid symbol duration 61 following the signal Ib and the guard interval period 60 of the delay time Ibd also have a high similarity (degree of correlation). Thus, the output Gc of the multiplier 54 increases beyond the reference th at time point t18. In this way, the control signal S is maintained at high level and the resent signal Or is resent from the resending antenna 34 also after time point t22. The transmission frequency of the resent signal is same as the transmission frequency of the input signal Ir.

As described above, in the case where the valid OFDM wave signal is input, a control loop is formed to control the voltage-controlled amplifier 32, so that the OFDM wave signal received by the receiving antenna 31 is resent from the resending antenna 34 as a resent signal Or amplified to a predetermined level.

The explanation will be made with reference to FIGS. 4A to 4E as to the operation of this embodiment in the case where the OFDM wave signal is regarded as a noise due to the low field level of the input signal Ir, on the other hand. The signal S/N is so low that the ratio of the noise which represents of the signal portion is high. Therefore, the waveforms of the final part 61a of the valid symbol duration of the signal Ib and the guard interval period 60 of the delay signal Ibd have a low similarity. As shown in FIG. 4C, therefore, the peak portion of the output Gc of the multiplier 54 is low. Specifically, since the product output Gc fails to exceed the reference value th, the level determiner 55 outputs no high-level control signal S as an instruction to open the gate, but a low-level control signal S (FIG. 4D) giving an instruction to close the gate. As a result, the output Or (FIG. 4E) of the voltage-controlled amplifier 32 is not output.

Consequently, in the case where an invalid OFDM wave signal is input due to an unfavorable condition, the control loop of the voltage-controlled amplifier 32 is cut off, and the operation of amplifying and resending the signal received through the receiving antenna 31 is substantially suspended.

An example of the relation between the state of the input signal Ir and the resent signal Or is explained briefly with reference to FIGS. 17A to 17D. Assume, for example, that the field level of the input signal Ir is middle to high and a valid OFDM wave signal is involved at about time point t0. The peak portion of the product Gc reaches the reference value th, and the control signal S is at high level, so that the resent signal Or continues to be output. With the subsequent gradual decrease of the field level of the input signal Ir, however, the peak portion of the output Gc of the multiplier 54 ceases to reach the reference value th at time point t7. At time point t8 that is the period 2T after time point t4 at which the peak portion of the output Gc has reached the reference value th in the preceding session, the control signal S drops to low level and the output of the resent signal Or is suspended. Soon after that, the field level of the input signal Ir is gradually increased and, reaching middle or high level, becomes a valid OFDM wave. Then, at time point t100 when the product Gc increases beyond the reference value th, the control signal S becomes high in level and the resent signal Or is output correspondingly.

The control loop of the voltage-controlled amplifier 32 is similarly cut off and the resending operation is substantially suspended also by the input of a signal wave other than the OFDM wave signal, which fails to produce the correlation based on the guard interval period.

Figure 5:
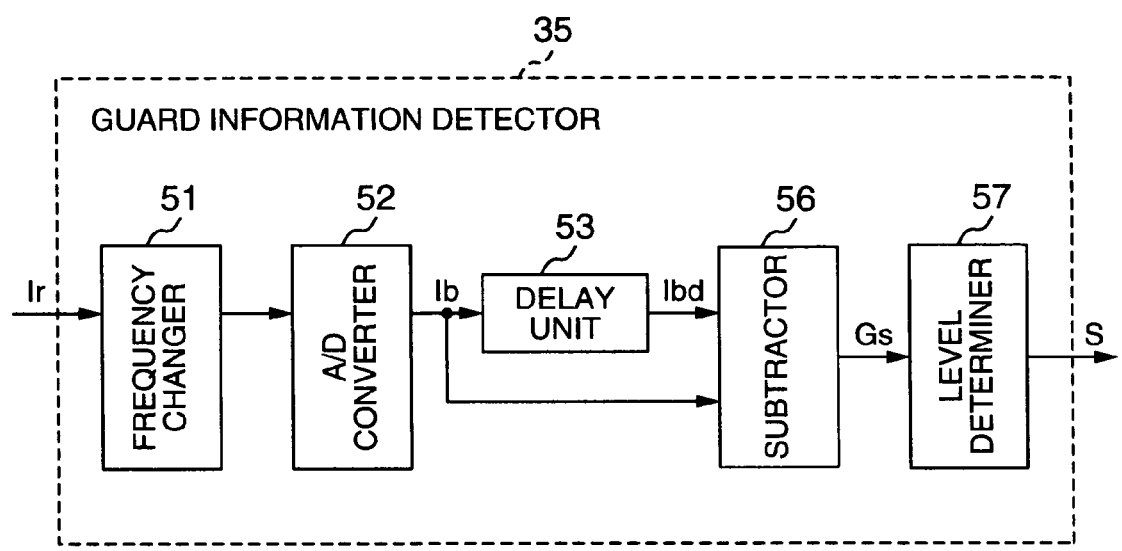
FIG. 5 is a block diagram showing a configuration of a guard information detection unit according to a second embodiment of the invention.
Figure 9:
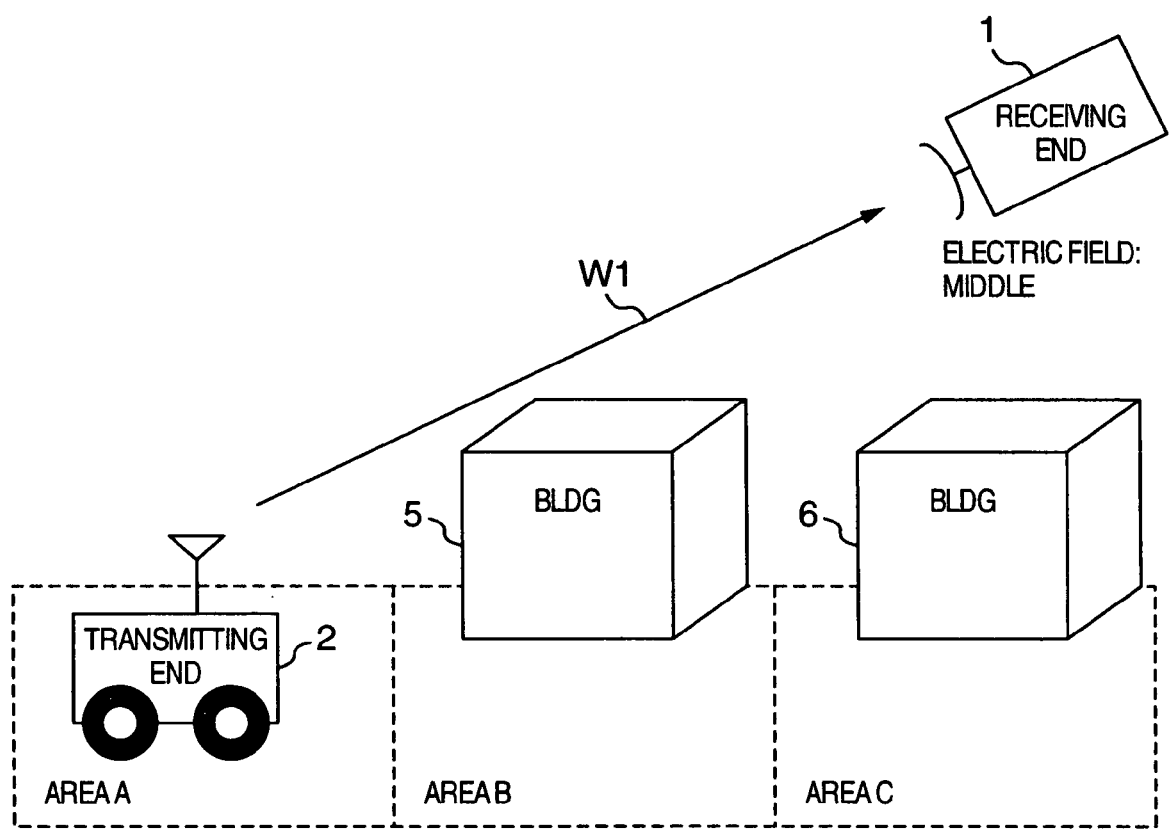
FIG. 9 is a schematic diagram for explaining the resending operation.
Figure 10:
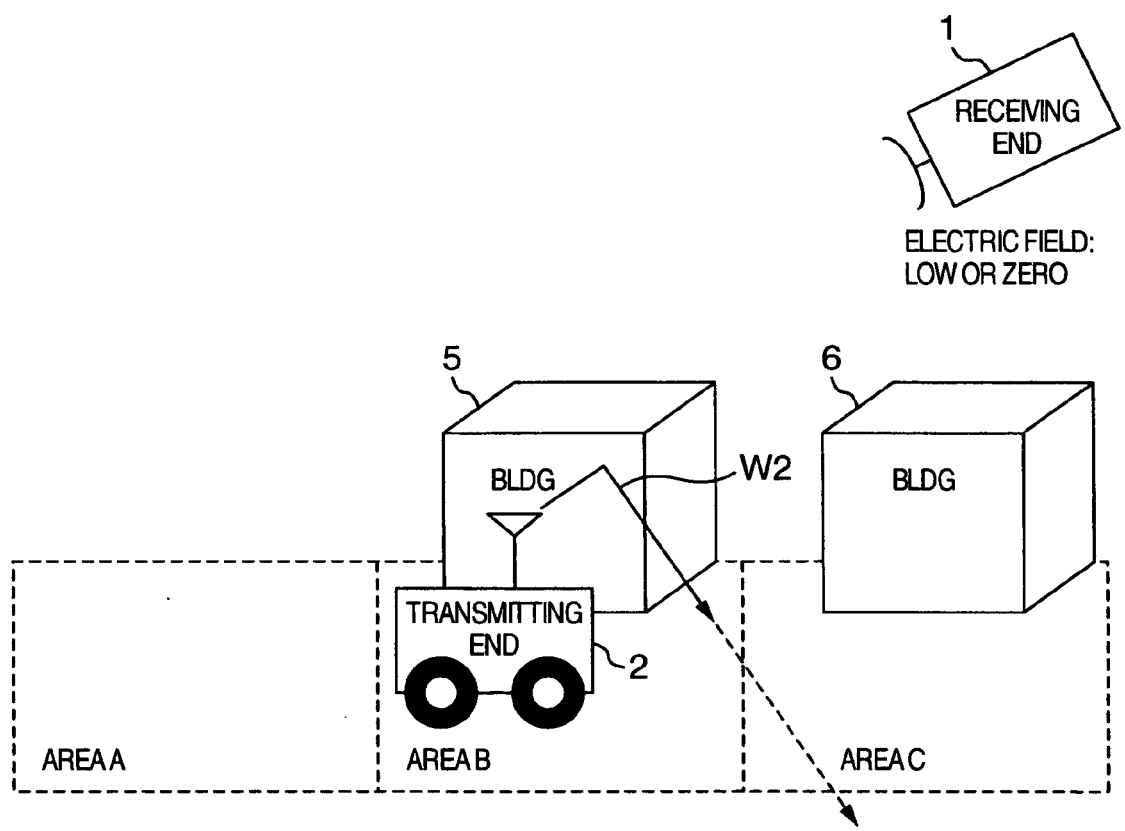
FIG. 10 is a schematic diagram for explaining the resending operation.
Figure 11:
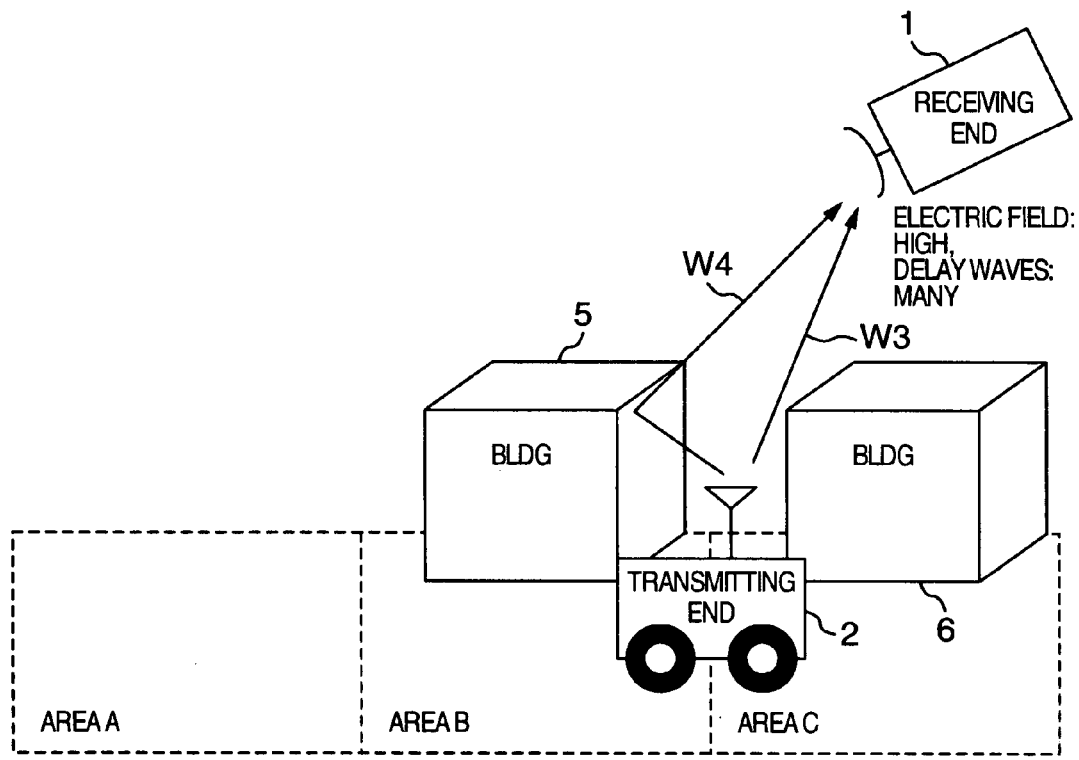
FIG. 11 is a schematic diagram for explaining the resending operation.
Figure 12:
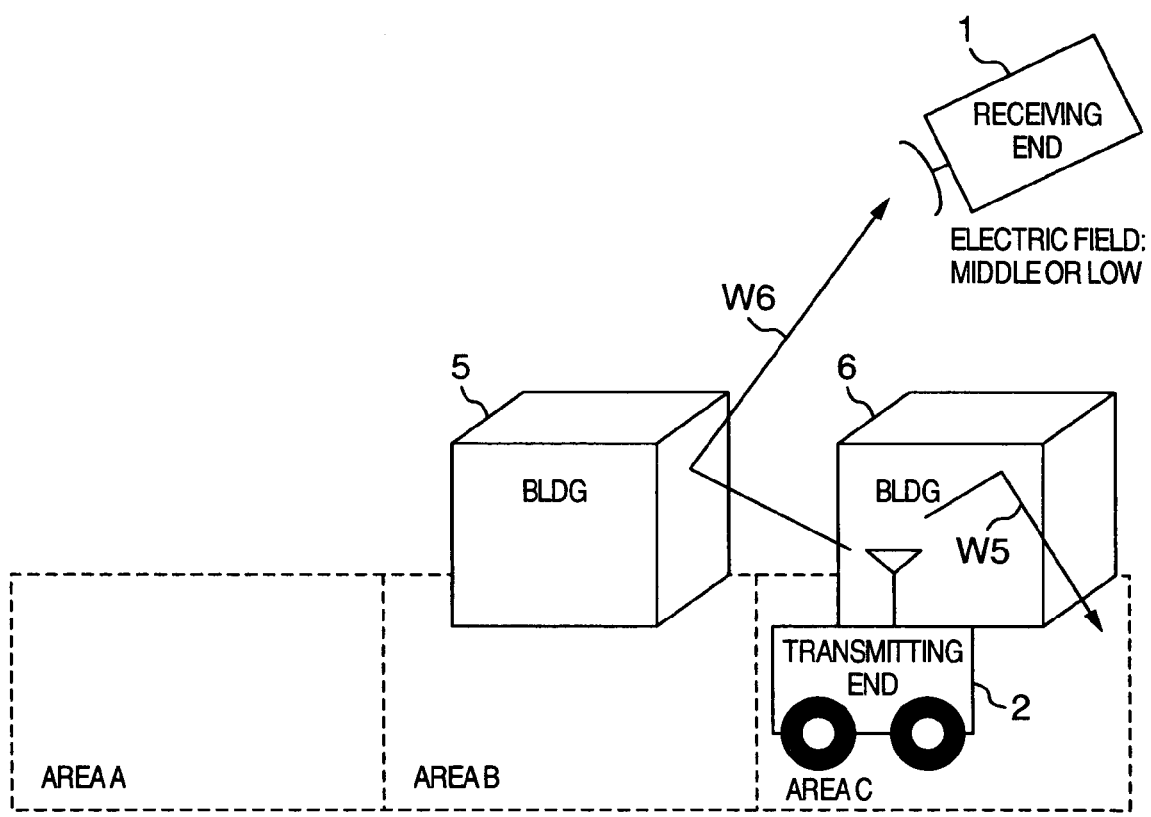
FIG. 12 is a schematic diagram for explaining the resending operation.
Figure 13:
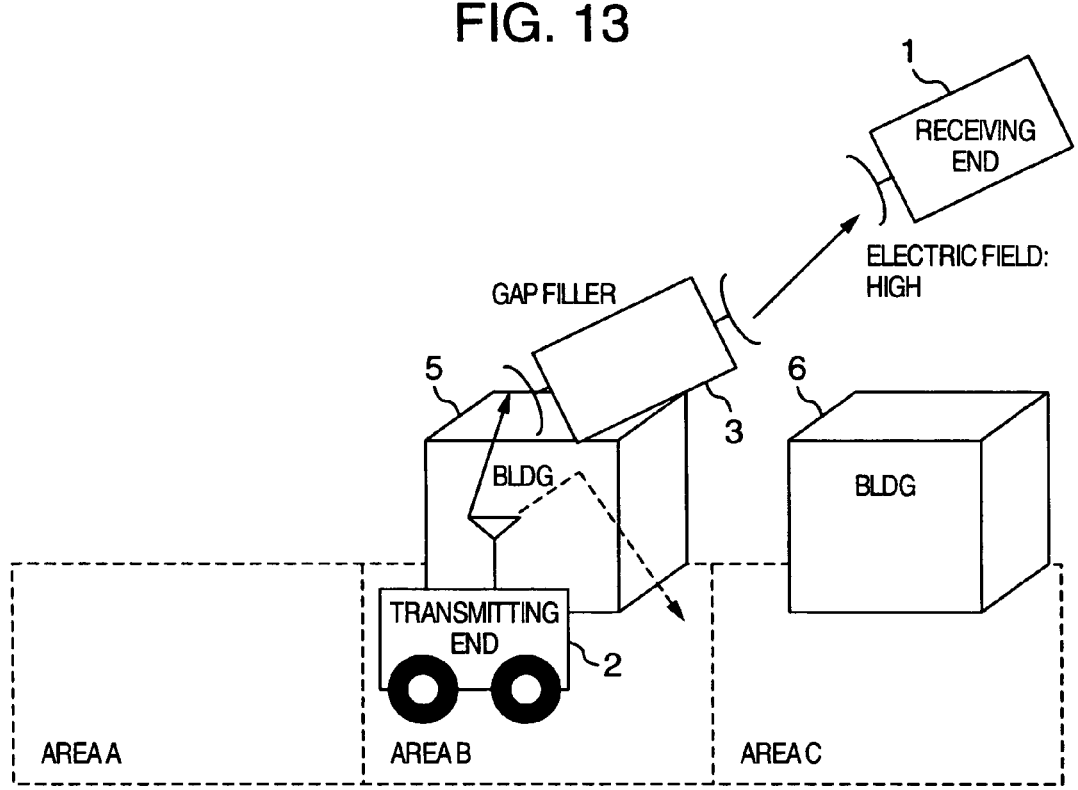
FIG. 13 is a schematic diagram for explaining the resending operation.

FIG. 5 shows a configuration of the guard detector 35 according to a second embodiment of the invention. Those component parts identical or similar to the corresponding component parts in the embodiment described above are designated by the same reference numerals, respectively, and not described again. In the second embodiment, a subtractor 56 is used in place of the multiplier 54 included in the first embodiment.

The signal Ib to which the input signal Ir is converted is input to both the delay unit 53 and the subtractor 56 dividedly, and the output Ibd of the delay unit 53 is input to the other terminal of the subtractor 56. The output Gs as an absolute value of the result of subtraction by the subtrator 56 is input to the level determiner 57, which compares the level of the difference Gs with a preset reference value th and outputs the determination result S to the control terminal of the gate 36.

The subtractor 56 produces the difference between the input signal Ib and the signal Ibd, and in the case where the input signal Gs constituting the result of subtraction is not higher than a predetermined level th even for a moment, the level determiner 57 continues to output a high-level control signal S over the time length of 2T.

As in the embodiment described above, the degree of correlation is determined in cycles of one symbol duration based on the guard interval period. By the amplifying operation of the amplifier 32 with the gate 36 open for at least one symbol duration, therefore, the valid OFDM wave signal can be resent. According to this embodiment, the valid OFDM wave signal can continue to be resent by opening the gate 36 for another one symbol duration period (i.e. a total of 2t). Although the time period for opening the gate 36 is set to be 2T in the aforesaid explanation, this time period may be substantially 1.1 T or more.

Next, the operation of this embodiment at the time of receiving an effective OFDM signal is explained with reference to FIGS. 6A to 6C and FIGS. 7A to 7C.

Also in this embodiment, like in the embodiments described above, the same waveform as the time waveform of a part (final part 61a) of the information of the valid symbol duration is added to the guard interval period 60.

Also, as shown in the drawings, like in the aforementioned embodiment, the delay T of the valid symbol duration 61 leads to the temporal superposition between the final part 61a of the valid symbol duration of the input signal Ib and the guard interval period 60 of the delay signal Ibd.

In the case where the field level of the input signal Ir is middle or high and constitutes a valid OFDM wave, the signal has so high a SN that the waveforms of the final part 61a of the valid symbol duration of the signal Ib and the guard interval period of the delay signal Ibd have a high similarity. As shown in FIG. 6C, therefore, the bottom of the output Gs of the subtractor 56 is reduced to below the reference value th. Once the difference output Gs is reduced below the reference value th, the level determiner 57 continues to output the high-level control signal S giving an instruction to open the gate to the gate 36 for as long as about the time length of 2T.

As a result, in the case where the valid OFDM wave signal is input, a control loop is formed to control the voltage-controlled amplifier 32, so that the OFDM wave signal received by the receiving antenna 31 is resent from the resending antenna 34 as a resent signal Or amplified to a predetermined level.

The explanation will be made with reference to FIGS. 7A to 7C as to the operation of this embodiment in the case where an OFDM wave signal is regarded as a noise due to the low field level of the input signal Ir, on the other hand. The ratio of the noises with respect to the signal portion in the OFDM signal is so high that the waveforms of the final part 61a of the valid symbol duration of the signal Ib and the guard interval period 60 of the delay signal Ibd have a lower similarity. Thus, as shown in FIG. 7C, the bottom of the output Gs of the subtractor 56 rises. Specifically, since the difference output Gs is not decreased below the reference value th, the level determiner 57 fails to output the high-level control signal S giving an instruction to open the gate but a low-level control signal S.

As a result, in the case where an invalid OFDM wave signal is input due to unfavorable conditions, the control loop of the voltage-controlled amplifier 32 is cut off, and the operation of resending by amplifying the signal received through the receiving antenna 31 is substantially suspended.

The control loop of the voltage-controlled amplifier 32 is cut off and the resending operation substantially stopped also by the input of the signal waves other than the OFDM wave which cannot produce the correlation based on the guard interval period.

Figure 16:
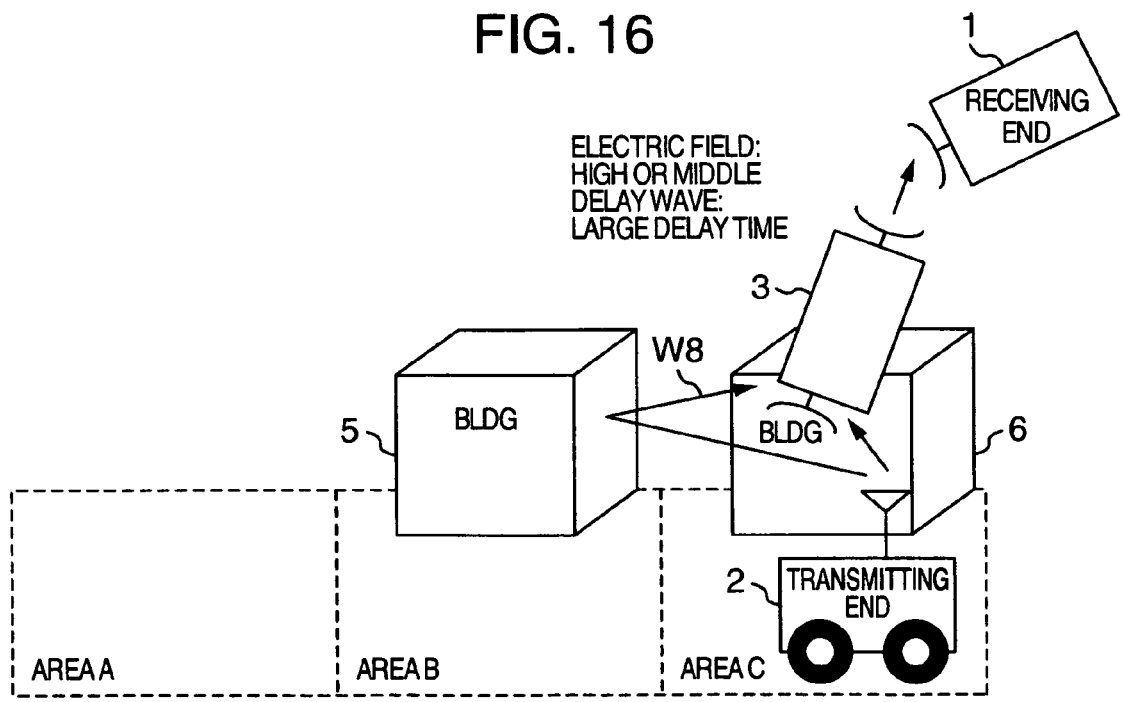
FIG. 16 is a schematic diagram for explaining the resending operation.
Figures 17A, 17B, 17C, 17D:
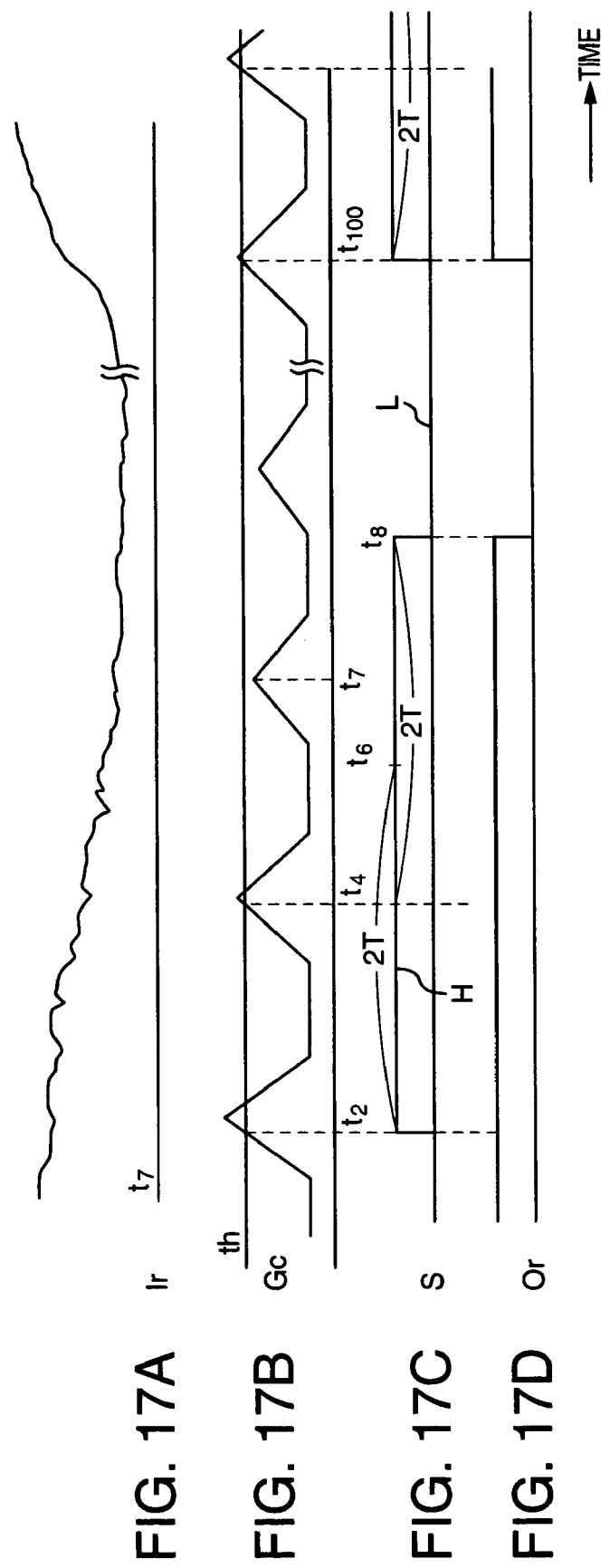
FIGS. 17A to 17D are timing charts showing various signal waveforms for explaining the operation of the first embodiment of the invention.
Figure 18:
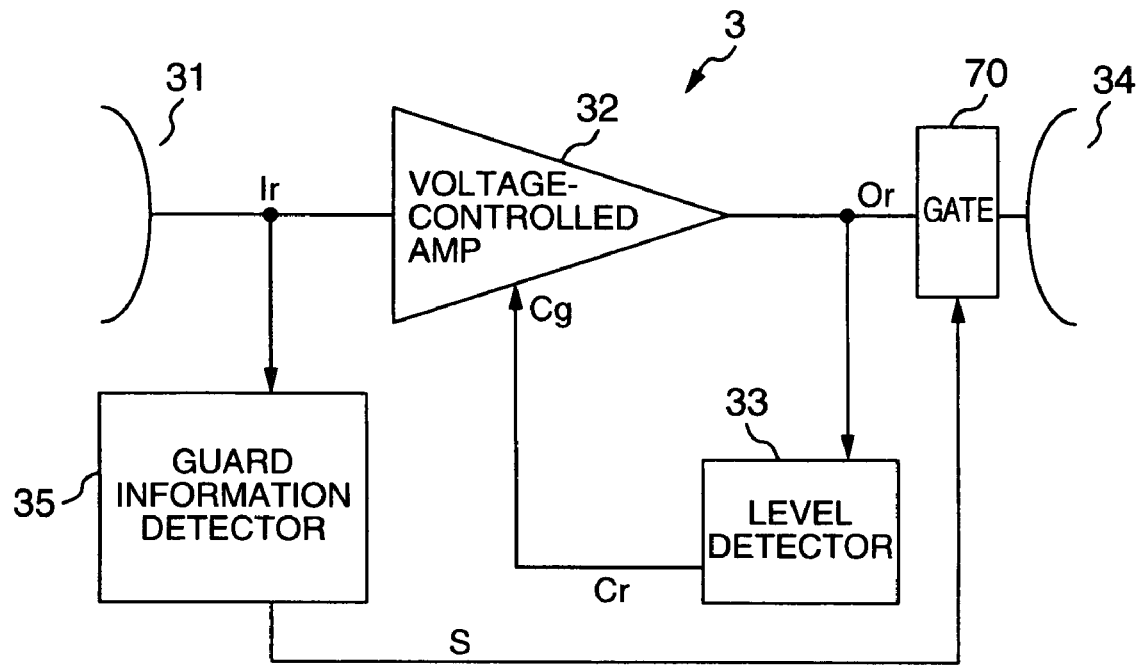
FIG. 18 is a block diagram showing a configuration of a modification of the resending apparatus according to the invention.

The explanation will be made with reference to FIGS. 8A to 8C as to the operation of this embodiment, in the case where the gap filler 3 is supplied with the signal Ir mixed with a reflected wave W8 having a delay time longer than the guard interval period 60 as illustrated with reference to FIG. 16. The signal output from the guard information detector 35 assumes the state as shown in FIG. 8C.

Specifically, the symbol duration 61 of the reflected delay wave W8 exists at the temporal position of the final part 61a of the valid symbol duration of the signal Ib of which the degree of correlation is determined and the guard interval period 60 of the delay signal Ibd, and therefore the degree of correlation between the two signals at the time position becomes lower. According to the first embodiment, therefore, the product Gc is not increased beyond the reference value th. According to the second embodiment, on the other hand, the difference Gs is not reduced below the reference value th.

In the case where an OFDM wave signal is input mixed with the reflected wave affected by the fading to an extent that cannot be ignored, therefore, the control loop of the voltage controlled amplifier 32 is cut off, and the operation of resending by amplifying the signal received through the receiving antenna 31 is substantially stopped.

In each of the embodiments described above, the resending operation is substantially suspended by stopping the amplifying operation of the amplifier. As an alternative, the resent signal can be prevented from being output by cutting off the path to the resending antenna 34 by a gate. Specifically, as in a modification shown in FIG. 18, for example, a gate 70 different from the gate 36 shown in FIG. 1 is interposed between the output of the amplifier 32 and the resending antenna 34, and the output Cr of the level detector 33 is input as an output Cg directly to the control terminal of the voltage-controlled amplifier 32, while the output S of the guard information detector 35 is input to the gate 70. In this configuration, in the case where the output S of the guard information detector 35 is at high level, the gate 70 outputs the voltage-controlled amplifier 32 as it is to the resending antenna 34. In the case where the output S of the guard information detector 35 remains at low level, on the other hand, the gate 70 cuts off the output of the voltage-controlled amplifier (or substitutes zero) and outputs it to the resending antenna 34.

Figure 19:
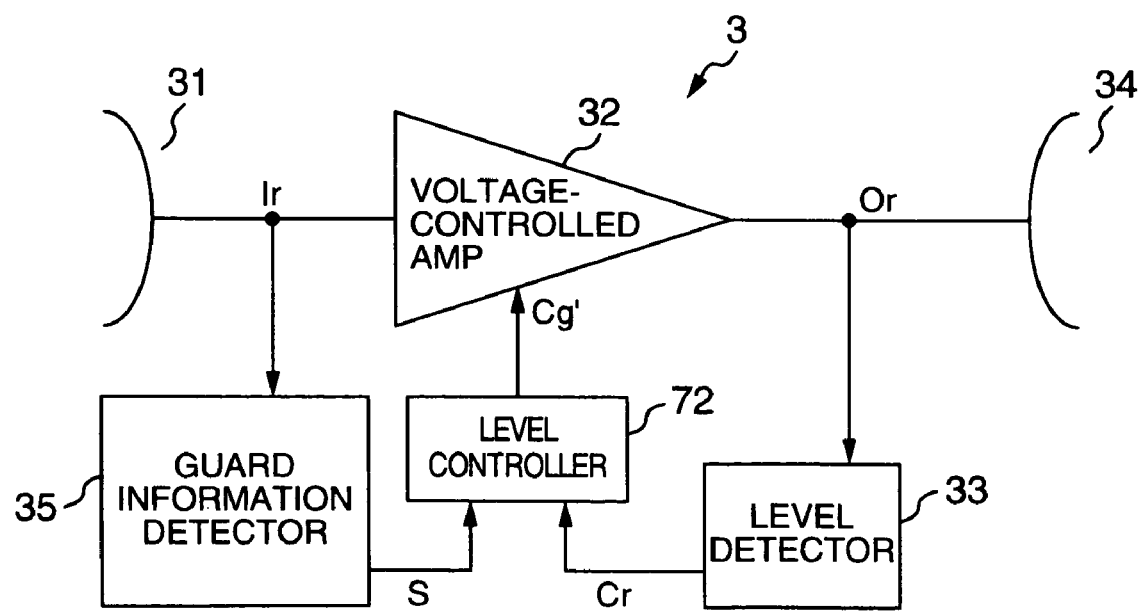
FIG. 19 is a block diagram showing a configuration of another modification of the resending apparatus according to the invention.

In each of the embodiments described above, the unnecessary received transmission signal is prevented from being resent by use of the information in the guard interval period of the received transmission signal. In a modification of the invention, the unnecessary received transmission signal is not prevented from being resent, but resent while suppressing the level of the resent signal to a degree posing no problem at the receiving end. According to this modification, as shown in FIG. 19, for example, a level control unit 72 is provided in place of the gate 36 shown in FIG. 1. In this configuration, in the case where the output S of the guard information detector 35 is at high level, the level control unit 72 outputs the input Cr as an input Cg' directly to the control terminal of the voltage-controlled amplifier 32. In the case where the output S of the guard information detector 35 is at low level, on the other hand, the level control unit 72 controls the input Cr and outputs it as Cg' to the control terminal of the voltage-controlled amplifier 32, so that the gain of the voltage-controlled amplifier 32 is reduced to a very small value. Specifically, the signal is resent by suppressing the level of the resent signal to a degree ignorable (i.e. to a very small level) at the receiving end.

Although the forgoing description takes the OFDM wave signal as an example, the invention is applicable also when resending a signal wave under another scheme with the guard interval period set periodically.

As described above, according to this invention, there is provided a resending apparatus for repeating and resending an input signal (Ir) having a guard interval period (60) containing a part of the information included in each symbol duration from a movable transmitting end (FPU 2), including:

an amplifier unit (32, 34) for amplifying and outputting the input signal (Ir) as a resent signal;

a delay unit (53) for delaying the input signal by the time corresponding to one valid symbol duration;

a determining unit (54, 56, 55, 57) for determining the degree of correlation between a part of the input signal and the guard interval period of the signal delayed by the delay unit; and a control unit (36, 70, 72) for restricting the resending operation of the amplifier unit in the case where the degree of correlation determined by the determining unit for the input signal (Ir) is lower than a predetermined degree and the input signal (Ir) is other than to be resent.

Also, in the case where the input signal (Ir) is determined as signal not to be resent, the control unit restricts the process of the amplifying unit to amplify the particular input signal (Ir) or stops or suppresses the output of the amplifier unit to a very small level.

In this way, based on the guard interval period set in the signal to be resent, the conditions of the input signal are determined to control the resending operation. Thus, only a valid transmission signal can be resent by repeating.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A resending apparatus for resending an input signal transmitted from a movable transmitting end and having a guard interval period for each symbol duration, comprising:
   a determining unit for determining whether the input signal is to be resent or not, based on the information of the guard interval period of the input signal; and
   a control unit for restricting the process of resending an input signal determined by the determining unit as a signal other than a signal to be resent.

2. A resending apparatus according to claim 1, wherein in the case where the control unit, upon determination that an input signal is other than a signal to be resent, performs selected one of suspending the process of resending the input signal and resending the resent signal by suppressing the level of the resent signal to a degree ignorable at a receiving end.

3. A resending apparatus according to claim 1, wherein the control unit determines an input signal to be a signal other than a signal to be resent, in the case where the input signal is a selected one of a signal of a different type having no guard interval period, a signal reduced in level to such an extent that the guard interval period cannot be detected, and a signal mixed with a reflected wave over the guard interval period causing an interference with a delay wave to such an extent that the guard interval period cannot be detected.

4. A resending apparatus for resending an input signal received from a movable transmitting end and having a guard interval period containing a part of information included in each symbol duration, comprising:
   an amplifier unit for amplifying the input signal and outputting the amplified signal as a resent signal;
   a delay unit for delaying the input signal by a time length corresponding to one valid symbol duration;
   a determining unit for determining the degree of correlation between a part of the input signal and the guard interval period of the signal delayed by the delay unit; and
   a control unit for restricting the resending operation of the amplifier unit in the case where the degree of correlation of the input signal determined by the determining unit is lower than a predetermined degree and the input signal is other than a signal to be resent.

5. A resending apparatus according to claim 4, wherein the control unit, upon determination that the input signal is other than a signal to be resent, performs a selected one of the operation of restricting the amplification of the input signal by the amplifier unit and an operation of suspending or suppressing the output of the amplifier unit to a very small level.

6. A resending apparatus according to claim 4, wherein the determining unit determines an input signal as a signal other than a signal to be resent, in the case where the input signal is a selected one of a signal of a different type having no guard interval period, a signal reduced in level to such an extent that the guard interval period cannot be detected, and a signal mixed with a reflected wave over the guard interval period causing an interference with a delay wave to such an extent that the guard interval period cannot be detected.

7. A resending apparatus according to claim 4, wherein the amplifier unit amplifies the input signal and outputs the amplified signal as a resent signal having a predetermined level.

8. A resending apparatus according to claim 4, wherein the amplifier unit amplifies the input signal and outputs the amplified signal as a resent signal having the same frequency as the input signal.

9. A resending apparatus according to claim 4, wherein the control unit, upon determination of an input signal as a signal to be resent, performs the resending operation by the amplifier unit at least for one symbol duration, and upon determination of the input signal as a signal other than a signal to be resent, suspends the resending operation of the amplifier unit.

10. A resending apparatus according to claim 4, wherein the determining unit includes a multiplier for multiplying a part of the input signal and the guard interval period of the signal delayed by the delay unit with each other, and a level determiner for determining that the input signal is to be resent in the case where a product is not less than a predetermined value.

11. A resending apparatus according to claim 4, wherein the determining unit includes a subtractor for producing the difference between a part of the input signal and the guard interval period of the signal delayed by the delay unit, and a level determiner for determining that the input signal is to be resent in the case where a product is not more than a predetermined value.

12. A resending method for resending an input signal received from a movable transmitting end and having a guard interval period for each symbol duration, said resending method comprising the steps of:
   determining whether the input signal is to be resent or not, based on information of the guard interval period of the input signal; and
   restricting the resending process of the input signal in the case where the input signal is determined as a signal other than a signal to be resent.

13. A resending method for resending an input signal received from a movable transmitting end and having a guard interval period containing a part of information included in each symbol duration, said resending method comprising the steps of:
   delaying the input signal by a time length corresponding to one valid symbol duration;
   determining a degree of correlation between a part of the input signal and the guard interval period of the signal delayed by the delay unit; and
   restricting the resending operation of amplifying the input signal and outputting the amplified signal as a resent signal in the case where the degree of correlation is low and the input signal is a signal other than a signal to be resent.

* * * * *